US007180731B2

(12) United States Patent
Titzler et al.

(10) Patent No.: US 7,180,731 B2
(45) Date of Patent: Feb. 20, 2007

(54) ALL-IN-ONE COMPUTER WITH HEIGHT ADJUSTABLE DISPLAY

(75) Inventors: David H. Titzler, Palo Alto, CA (US); Chen-Chien Kuo, Taipei (TW); Stephen T. Schooley, San Jose, CA (US)

(73) Assignee: Flextronics International USA, Inc., San Jose, CA (US)

( * ) Notice: Subject to any disclaimer, the term of this patent is extended or adjusted under 35 U.S.C. 154(b) by 0 days.

(21) Appl. No.: 10/949,704

(22) Filed: Sep. 24, 2004

(65) Prior Publication Data

US 2005/0270732 A1 Dec. 8, 2005

Related U.S. Application Data

(63) Continuation-in-part of application No. 29/207,136, filed on Jun. 8, 2004, now Pat. No. Des. 504,426.

(51) Int. Cl.
*G06F 1/16* (2006.01)

(52) U.S. Cl. .................................. 361/681; 361/683
(58) Field of Classification Search ............... 174/52.1, 174/520; 361/681, 683; 312/223.2
See application file for complete search history.

(56) References Cited

U.S. PATENT DOCUMENTS

| 4,832,419 | A | | 5/1989 | Mitchell et al. ............. 312/7.2 |
| 5,100,098 | A | | 3/1992 | Hawkins ..................... 248/917 |
| 5,831,696 | A | * | 11/1998 | Sheng .......................... 349/58 |
| 5,854,735 | A | | 12/1998 | Cheng .......................... 361/681 |
| 5,947,440 | A | * | 9/1999 | Cho ............................ 361/681 |
| 6,134,103 | A | * | 10/2000 | Ghanma ..................... 361/681 |
| 6,154,261 | A | | 11/2000 | Shim ............................ 349/58 |
| 6,188,569 | B1 | | 2/2001 | Minemoto et al. .......... 361/683 |
| 6,233,139 | B1 | * | 5/2001 | Hamon ....................... 361/681 |
| 6,288,891 | B1 | | 9/2001 | Hasegawa et al. .......... 361/681 |
| 6,366,453 | B1 | | 4/2002 | Wang et al. ................ 361/681 |
| 6,418,010 | B1 | * | 7/2002 | Sawyer ....................... 361/681 |
| 6,464,195 | B1 | | 10/2002 | Hildebrandt ................ 248/460 |
| 6,480,374 | B1 | | 11/2002 | Lee ............................. 361/681 |
| 6,560,093 | B1 | * | 5/2003 | McLeod et al. ............. 361/681 |
| 6,563,705 | B1 | | 5/2003 | Kuo ............................. 361/687 |
| 6,618,241 | B2 | | 9/2003 | Bang .......................... 361/681 |
| 6,657,857 | B2 | * | 12/2003 | Lan ............................. 361/685 |
| 6,697,250 | B2 | | 2/2004 | Kuo ............................. 361/681 |
| 2004/0150945 | A1 | * | 8/2004 | Mache et al. ............... 361/683 |
| 2005/0041379 | A1 | * | 2/2005 | Jang ............................ 361/681 |
| 2005/0207101 | A1 | * | 9/2005 | Hwang et al. .............. 361/681 |

* cited by examiner

*Primary Examiner*—Hung V. Ngo
(74) *Attorney, Agent, or Firm*—Henneman & Associates, PLC; Larry E. Henneman, Jr.

(57) ABSTRACT

A novel integrated computer includes a support base, a computer component pivotally coupled to the support base, and a display component slidably coupled to the computer component. The pivotal connection between the support base and the computer component facilitates adjustment of the tilt of the display. The slidable connection between the computer component and the display component facilitates height adjustment of the display, without affecting the tilt of the display. A biasing member prevents unwanted movement of the display, while allowing adjustment of the display. A method for manufacturing the integrated computer is also disclosed.

18 Claims, 8 Drawing Sheets

ALL-IN-ONE COMPUTER WITH HEIGHT ADJUSTABLE DISPLAY

RELATED APPLICATIONS

This application is a continuation-in-part of U.S. patent application Ser. No. 29/207,136 filed Jun. 8, 2004 now U.S. Pat. No. Des. 504,426, by at least one common inventor, which is incorporated herein by reference in its entirety.

BACKGROUND

1. Field of the Invention

This invention relates generally to computer design and assembly, and more particularly to computers comprising integral flat-panel displays. Even more particularly, the invention relates to computers with integral, user-adjustable, flat-panel displays.

2. Description of the Background Art

A conventional personal computer includes multiple components (main computer case, keyboard, monitor, speakers, etc.,). Traditionally, these components were typically separate from one another, the separate components being connected by electronic cables. For example, the main computer case could be placed under a desk, and the monitor could be placed on top of the desk. The components would then be connected together via a video cable.

As the complexity of computer systems increased, so did the number of interconnecting cables required to assemble a system. A large number of interconnecting cables can be unsightly, difficult to route, and difficult to connect properly. Further, intertangling power and data cables can adversely affect data transfer through the cables. As the complexity of computer systems increases, it is expected that these problems will also continue to increase.

For various reasons, including those mentioned above and aesthetics, there have been efforts to integrate the components of computers, and to make the computers as compact as possible. For example, systems have been developed wherein multiple computer components (e.g., motherboard, hard drives, removable media drives, speakers, etc.) have been integrated with a display component (e.g., flat panel display, cathode ray tube, etc.) to form an integrated computer system (e.g., laptop computers, desktop computers, etc.) that does not require the user to connect the components together with electronic cables. In one example of an integrated desktop computer, the computer components are mounted within the same housing that houses the display. All or most of the interconnections between the components are made by the manufacturer within the housing. This eliminates the additional cost and inconvenience of external electrical connectors and connecting cables.

While integrated computers address the problems described above, it becomes more difficult to provide a means for adjusting the position and orientation of the display. In some prior art integrated computers, the only way to adjust the display position is to raise or tilt the entire computer system. In other prior art integrated computers, the display component is moveable with respect to the computer component, but the range of movement is relatively constrained.

For example, U.S. Pat. No. 6,188,569 by Minemoto et al. discloses an integrated computer system with an LCD display. The entire computer system can be tilted about a horizontal axis to accommodate viewing from different heights, but the display provides no real height adjustment.

U.S. Pat. No. 4,832,419 by Mitchell et al. discloses a computer that can be tilted backward or forward about a horizontal axis to adjust the viewing angle. Further, the display can be raised relative to the computer housing to provide height adjustment. The display is mounted to the housing by a pair of arms such that the display panel can be moved between lowered and raised positions. Movement of the display is guided by a cam wheel disposed in a cam track. An upper end of the cam track is narrowed, such that the display is supported in the raised position by frictional engagement of the cam wheel by the narrowed cam track. No stable support is provided in positions intermediate the raised and lowered positions. Thus, height adjustment is limited to the raised and lowered positions. Furthermore, the viewing angle changes as the height of the display changes, such that an additional tilt adjustment is required.

What is needed, therefore, is an integrated computer that provides display height adjustment over a range of positions. What is also needed is a computer that provides display tilt adjustment. What is also needed is a computer that provides display height adjustment without disturbing the tilt adjustment.

SUMMARY

The present invention overcomes the problems associated with the prior art by providing an integrated computer that can be height adjusted through a range of positions and tilt adjusted. Adjustment of the display height does not affect the tilt angle of the display.

The computer includes a support base, a computer component pivotally connected to the support base, and a display component slidably coupled to the computer component. In a particular embodiment, the computer component includes a generally flat front surface, and the display component includes a generally flat rear surface facing the front surface of the computer component. Electronic circuits within the display component and the computer component are coupled via a flexible electronic connector, which passes through apertures in the facing surfaces of the computer component and the display component. The support base includes a flat base portion, and a vertically inclined portion extending forwardly and upwardly toward said pivotal connection with said computer component.

In one particular embodiment, the display component includes a flat panel display (e.g., a liquid crystal display) and a pair of speakers. The computer component includes adjustments/controls, indicator lights, electronic connectors, and/or a power switch located on a lower portion of the front surface of the computer component. In the lowest height adjusted position, the display component does not block access to the adjustments/controls, indicator lights, electronic connectors, and/or a power switch located on a lower portion of the front surface of the computer component. The computer component further includes a plurality of external electronic connectors disposed on a back surface thereof and a removable media drive accessible through a side surface thereof.

The computer component is oriented vertically, such that the computer is both taller and wider than it is deep. In the particular embodiment shown, the depth of the computer component is less than one-half the width of the computer component.

The pivotal connection between the computer component and the base facilitates forward and backward tilting of the computer component. The slidable coupling between the computer component and the display component allows the display component to move in a plane adjacent the computer component. Thus, adjusting the height of the display does not change the tilt angle.

Means for slidably mounting the display component to the computer component are also disclosed. In a particular embodiment, the coupling between the computer component and the display component is provided by a slide assembly, which includes a slide member and a complimentary slide member that slidably engage one another. The slide member is fixed to the computer component, and the complementary slide member is fixed to the display component. In a more particular embodiment, a such single slide assembly is vertically mounted to a front, central portion of the computer component. In an alternative embodiment, the slide member is integrally formed on the housing of the computer component, and the complementary slide member is integrally formed on the housing of the display component. For example, the slide member can include a pair of structures each formed along a respective lateral portion of the computer component, and the complementary slide member can include another pair of structures each formed along a respective lateral portion of the display component.

The computer further includes a biasing member coupled to retain the display component in a fixed position relative to the computer component in the absence of an external force (e.g., adjustment by a user), and yet facilitate movement of the display component with respect to the computer responsive to an external force. In other words, the biasing member will prevent movement of the display component due to the force of gravity, yet facilitate adjustment by a user. In a particular embodiment, the biasing member includes a fixed force spring. In a more particular embodiment, the fixed force spring includes a generally flat, flexible member having a first coiled end and a second end. The coiled end of the spring is disposed in a recess formed in either the computer component or the display component, and the second end of the spring is fixed to the other of the computer component or the display component.

A method of manufacturing an integrated computer is also described. The method includes the steps of providing a computer component, providing a support base, providing a display component, pivotally mounting the computer component to the support base, and slidably mounting the display component to the computer component. In a particular method, the step of providing the display component includes selecting the display component from a plurality of different type display components, each adapted to slidably mount to the computer component. Optionally, the step of providing the computer component includes selecting the computer component from a plurality of different type computer components, each adapted to slidably mount to the display component.

It should be noted that no particular element of the present invention is considered to be an essential element of the present invention, unless explicitly so stated.

BRIEF DESCRIPTION OF THE DRAWINGS

The present invention is described with reference to the following drawings, wherein like reference numbers denote substantially similar elements:

FIG. 7A is a representational side view of the computer of FIG. 1 showing the fixed force spring being relatively uncoiled when the display component is in a lowered position.

DETAILED DESCRIPTION

The present invention overcomes the problems associated with the prior art, by providing an integrated computer that facilitates display height and tilt adjustment over a continuous range of positions. In the following description, numerous specific details are set forth (e.g., examples of jacks and ports, components included in the computer and display components, etc.) in order to provide a thorough understanding of the invention. Those skilled in the art will recognize, however, that the invention may be practiced apart from these specific details. In other instances, details of well known computer manufacturing practices (e.g., electrical connections, assembly, etc.,) and components have been omitted, so as not to unnecessarily obscure the present invention.

Figure 1:
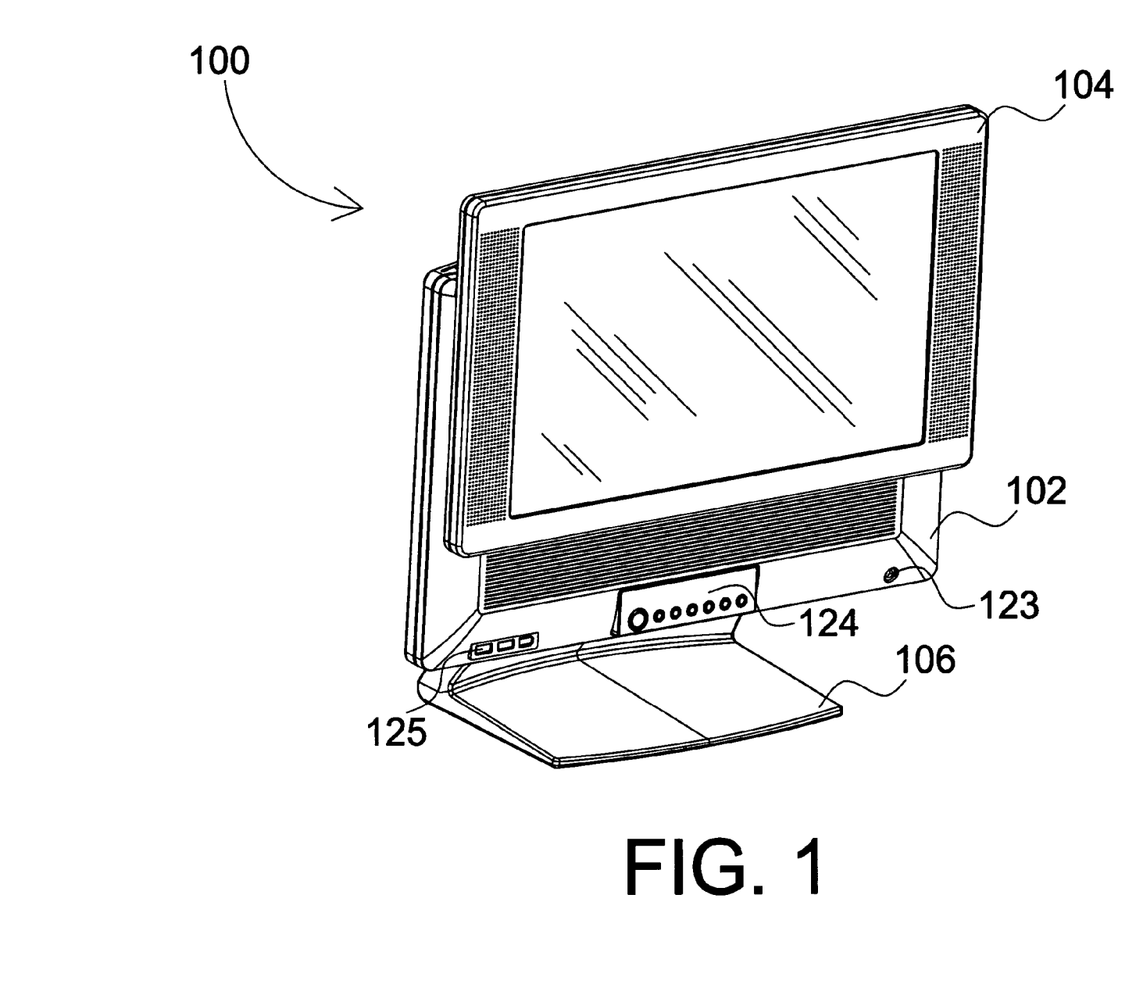
FIG. 1 is a perspective view of an integrated computer with a height adjustable display.

FIG. 1 shows a perspective view of an integrated computer 100 that includes means for tilt adjustment and height adjustment of the display. As used herein, the term integrated computer includes computers that have a display component and a computer component mounted together.

The particular embodiment shown in FIG. 1 includes a computer component 102, a display component 104, and a support base 106. Display component 104 is slidably mounted to computer component 102, such that display component 104 can slide up and down with respect to computer component 102, thereby providing height adjustment. Computer component 102 is pivotally mounted on support base 106, such that computer component 102 can be tilted toward or away from a user. This enables tilt adjustment of the display component 104 with respect to the user.

The unique combination of the pivotal connection between base 106 and computer component 102, and the slide connection between computer component 102 and display component 104 enables height adjustment of display component 104 without altering the tilt angle. In particular, display component 104 moves in a direction substantially parallel to the front surface of computer component 102.

It should be noted that when describing the directional movement of display component 104 with respect to computer component 102, the term "vertical" is used even when computer component 102 is tilted and display component 104 is not moving precisely vertically. For example, when computer component 102 is tilted back, vertical adjustment of display component 104 would result in movement predominantly in the vertical direction, but would also include a slight horizontal component of motion.

The bottom, front portion of computer component 102 includes a headphone jack 123, a plurality of control/adjustment devices 124, and a plurality of interface ports 125. Control/adjustment devices 124 include a power switch, indicator lights, audio controls, display adjustments, etc., which can be accessed by a user. Indicator lights indicate, for example, whether the computer 100 is in a powered on state, whether a hard disk drive within computer component 102 is being accessed, and/or whether computer component 102 is coupled to a power source. It should be understood that the specific controls, adjustments, and indicator lights listed are provided by way of example. Indeed, virtually any type of control, adjustment device, or indicator light could be used with the invention. In the particular embodiment shown, interface ports 125 include two universal serial bus ("USB") ports and one IEEE1394 (or Firewire) port. It should be understood, however, that mayn other types of ports and/or connectors (audio, video, microphone, etc.) can be provided in the lower front surface of computer component 102, including those now known or those to be later developed.

Figure 2A:
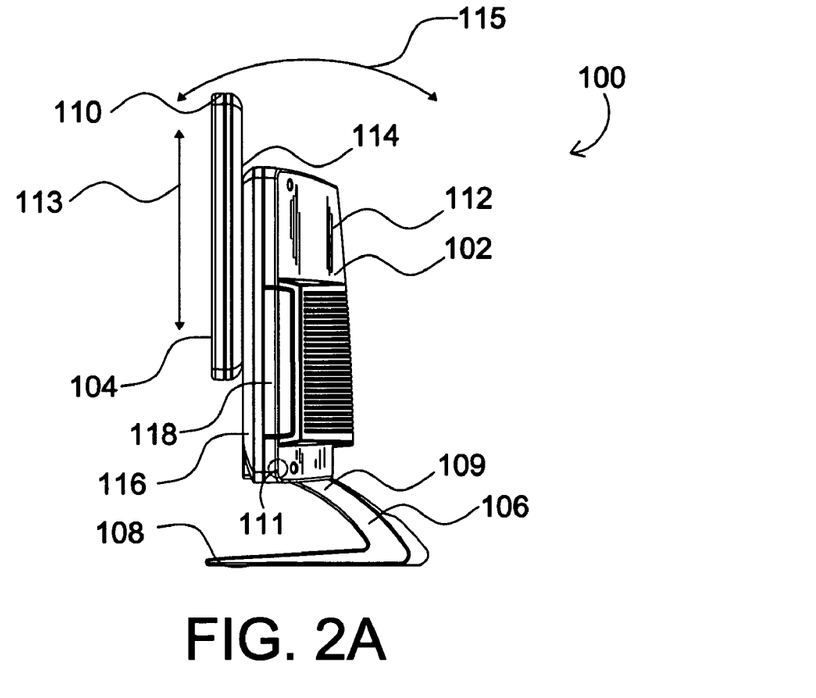
FIG. 2A is a side view of the computer of FIG. 1 with a display component in a raised position.

FIG. 2A is a side view of computer 100, wherein computer component 102 is tilted such that computer component 102 and display component 104 are roughly vertical. Support base 106 includes a foot portion 108 and a riser 109, which extends upwardly and forwardly from the rear edge of foot portion 108 to the pivotal connection with computer component 102. In this particular embodiment, computer component 102 is pivotally coupled to support base 106 via a horizontally disposed hinge pin 111. An appropriate degree of friction is provided between support base 106 and computer component 102 to secure computer component 102 in any user-adjusted tilt position, yet facilitate tilt adjustment with the application of minimal manual force. The structure of support base 106 also leaves the space 128 under computer component 104 open for temporary storage of computer related accessories (e.g., the keyboard).

The side view of FIG. 2A also shows the adjustment directions provided by computer 100. In particular, display component 104 can be raised and lowered with respect to computer component 102 as indicated by directional arrow 113. Computer component pivots about hinge pin 111 as shown by directional arrow 115. Thus, both tilt and height adjustment are provided.

The upright orientation of computer 100 at least partially facilitates the pivotal mount of computer component 102 to support base 106. In particular, note that the depth (horizontal in the plane of the page) of computer 100 is less than the height (vertical in the plane of the page) of computer 100 and less than the width (perpendicular to the plane of the page) of computer 100. Therefore, support base 106 can have a smaller footprint, and still maintain the center of gravity of computer 100 over support base 106 during tilt adjustment.

The internal components of computer 100 are housed in two separate housings, 110 and 112. In this particular embodiment, display component housing 110 houses a flat panel display and a pair of speakers. Optionally, other components (e.g., a video camera, a microphone, etc.) can be included in display housing 110. Computer component housing 112 houses a main computer board, one or more fixed hard drives, communication devices, a power supply, and so on. The inventor contemplates that computer component housing 112 can be adapted to house any type of device, now known or later developed, for use in a personal computer.

Note particularly, that in this disclosed embodiment, computer component 102 includes a removable-media drive 118 (e.g., CD ROM drive), accessible through an opening in the side of computer component housing 102. Removable-media drive 118 is mounted in an upright position, so as not to unnecessarily increase the depth of computer component 102, and accepts media along the horizontal direction (in and out of the plane of the page).

Those skilled in the art will recognize that this particular element (as well as other described elements, even if not explicitly stated) is not an essential element of the present invention. For example, the present invention may be practiced with alternate removable media devices such as flash cards or memory sticks. Further, in particular embodiments of the invention, this element may be omitted.

In this particular embodiment, a rear portion 114 of display housing 110 slidably abuts a front portion 116 of computer component housing 112. This makes use of space efficiently, while also allowing display component 104 to move independently from computer component 102.

Figure 2B:
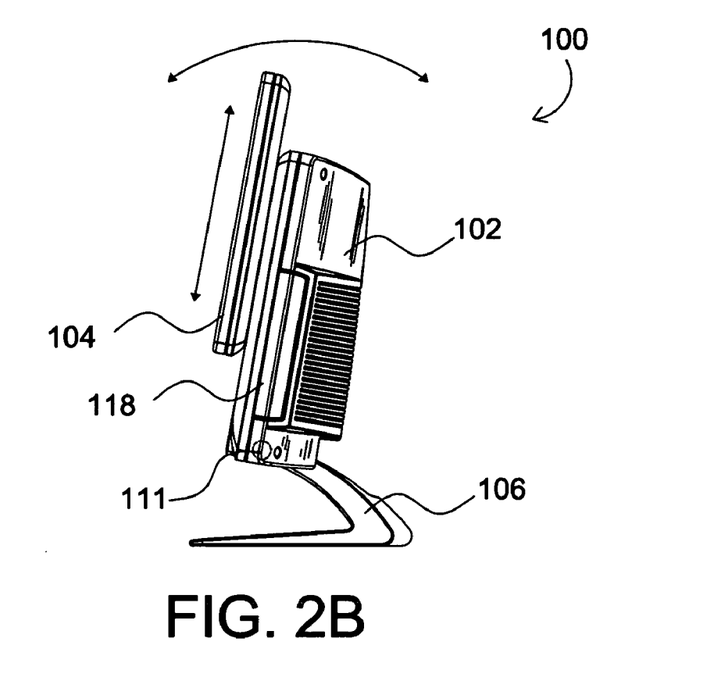
FIG. 2B is a side view of the computer of FIG. 2A in a tilted position.

FIG. 2B shows a side view of computer 100 in a tilted position with display component 104 in a raised position. Note that, as indicated above, the center of gravity of computer 100 remains over support base 106.

Figure 3:
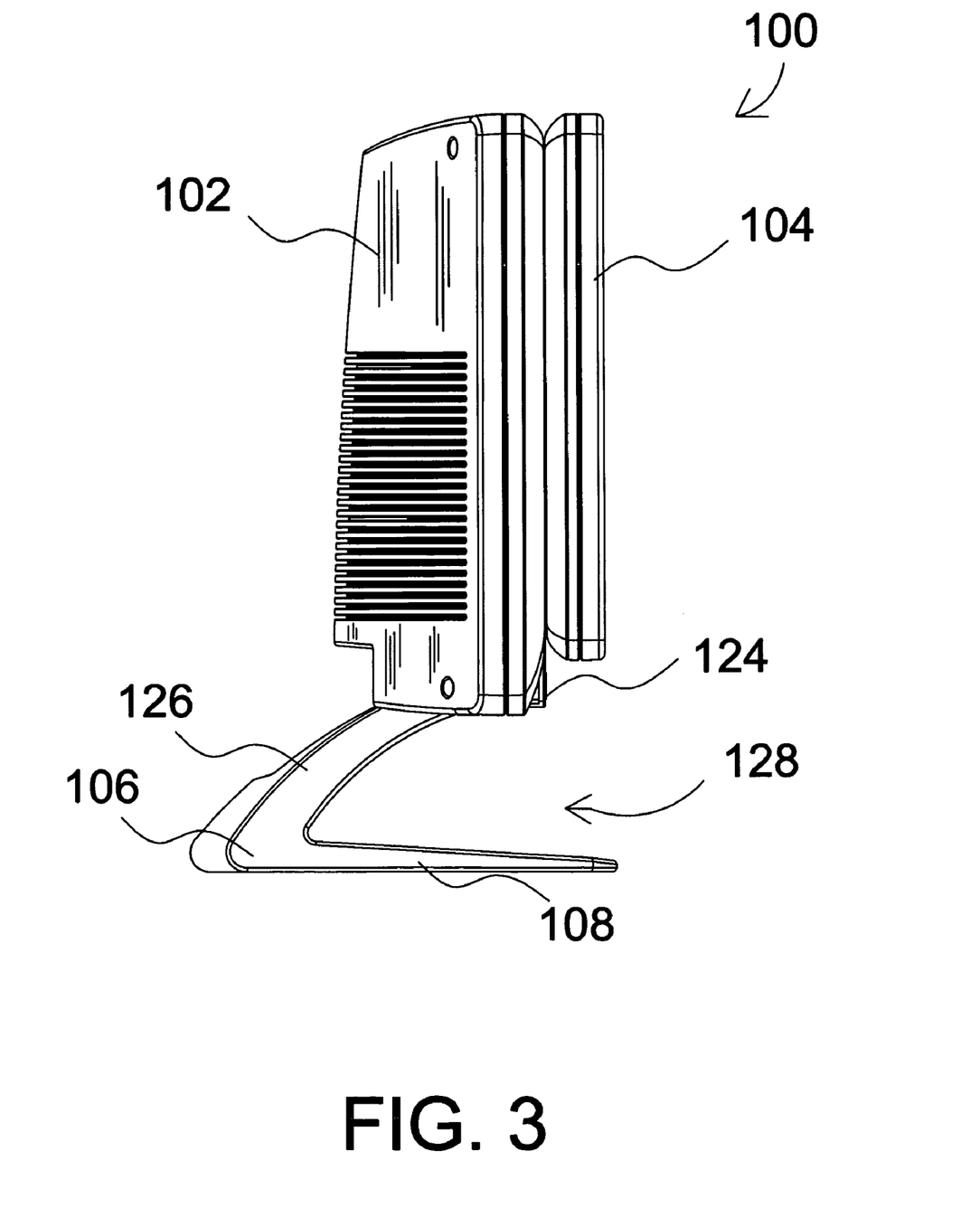
FIG. 3 is an opposite side view of the computer of FIG. 1 in an upright position with the display component in a lowered position.

FIG. 3 shows an opposite side view of computer 100 in a substantially vertical position with display component 104 is lower most position. Note that in this lowest position, display component 104 does not conceal the bottom front portion of computer component 102. This enables a user to access control/adjustment devices 124, as well as headphone jack 123 and interface ports 125 (FIG. 1), even when display component 104 is in the lowest possible position.

Figure 4A:
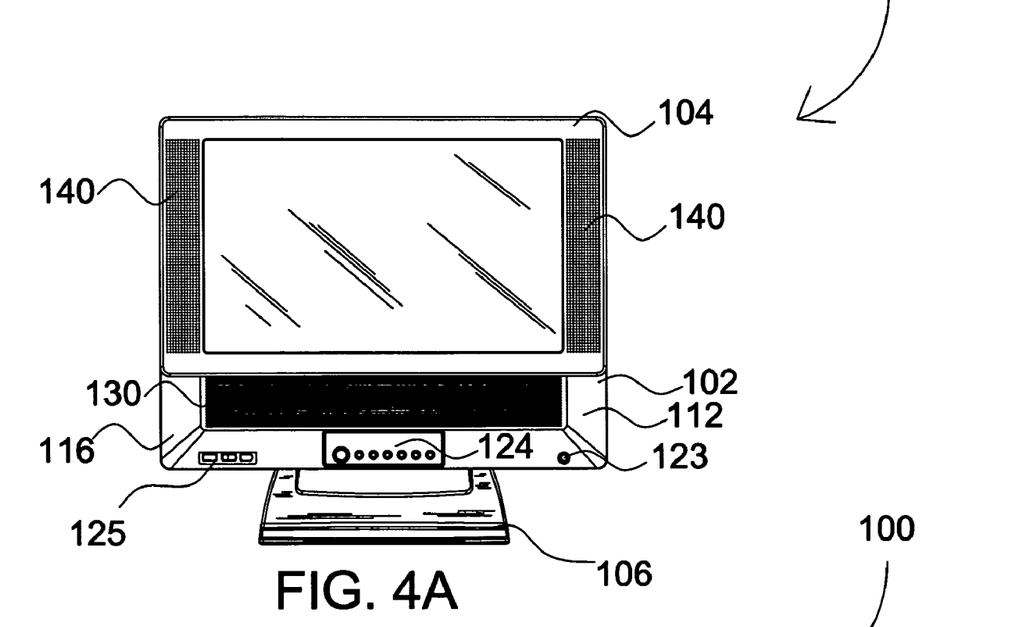
FIG. 4A is a front view of the computer of FIG. 1 with the display in a raised position.

FIG. 4A is a front view of computer 100 with display component 104 in a raised position. Computer component housing 112 includes air vents 130 that permit air flow over inner components of computer 100 sufficient to allow computer 100 to maintain proper operating temperatures. Optionally, a fan is provided to increase the air flow through computer component 102. In this particular view, it is also apparent that support base 106 is significantly narrower than the width (less than two-thirds) of computer 100, providing a small footprint for computer 100.

Figure 4B:
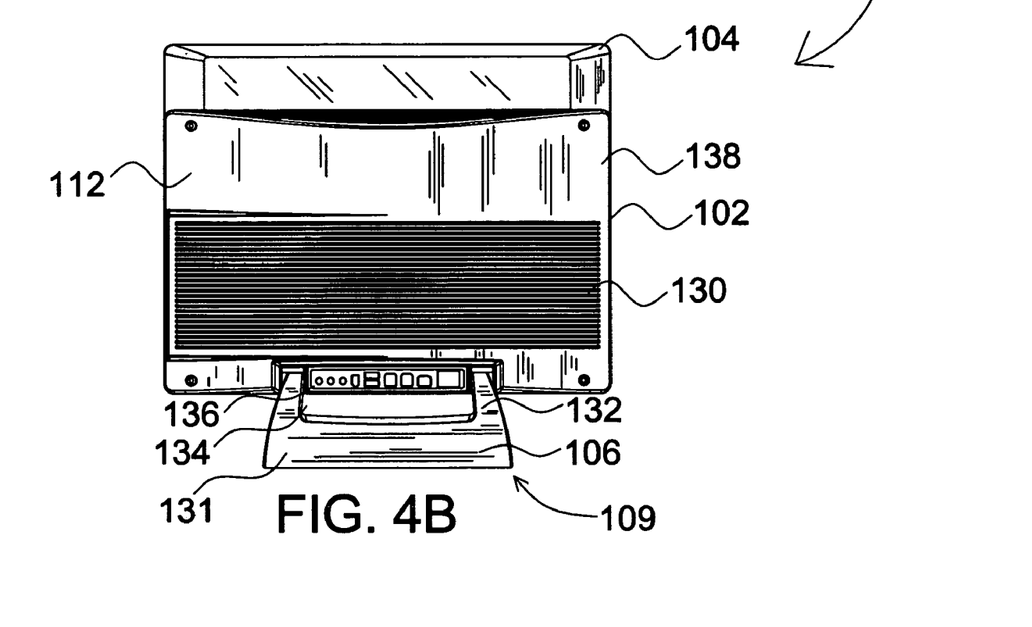
FIG. 4B is a rear view of the computer of FIG. 1 with the display in a raised position.

FIG. 4B is a rear view of computer 100 with display component 104 in a raised position. In this particular embodiment, riser 109 includes a wide base portion and two arms 132 that are pivotally connected computer component 102. Arms 132 are spaced apart to define a void 134 to allow various electrical cables (not shown) to be connected to corresponding electrical connectors 136. Examples of electrical connectors 136 include, but are not limited to a power connector, a telephone jack, USB connectors, network connectors, audio connectors, video connectors, and such other connectors as may be desirable in a personal computer. The rear surface 138 of housing 112 also defines a plurality of air vents 130 that permit air flow through computer component 102.

Figure 5:
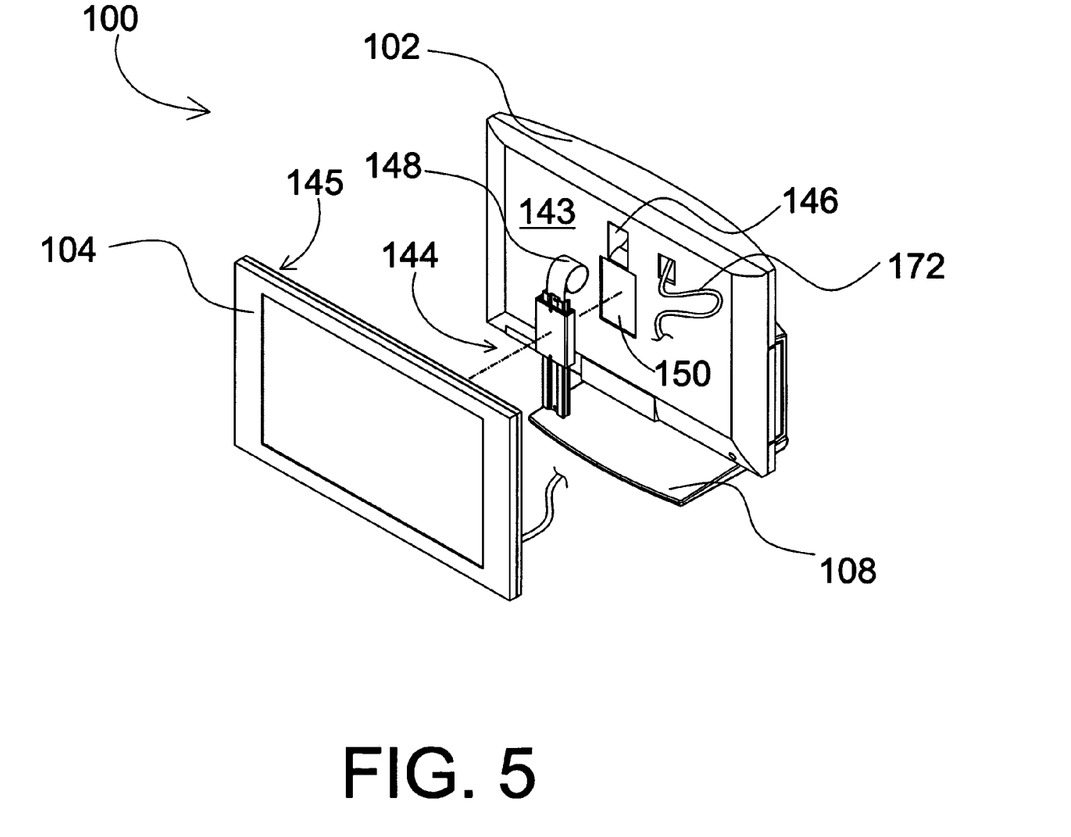
FIG. 5 is a partially exploded view of the computer of FIG. 1 showing a slide assembly disposed between a display component and a computer component of the computer.

FIG. 5 is a partially exploded view of computer 100 showing a slide assembly 144 disposed between display component 104 and computer component 102. In this particular embodiment, computer component includes a generally flat, slightly recessed front surface. Similarly, display component 104 includes a generally flat, slightly recessed rear surface 145 facing front surface 143 of computer component 102. Electrical communication between the constituent parts of computer component 102 and display component 104 is provided by a multiconductor service loop 172, which passes through apertures disposed in the front surface of computer monitor 102 and the rear surface of display component 104.

Computer component 102 and display component 104 are coupled to one another via slide assembly 144. Complementary portions of slide assembly 144 are coupled (e.g., by screws) to computer component 102 and display component 104 to provide the sliding adjustment previously described herein. A biasing member 148 holds display component 104 in position relative computer component 102, unless an external force sufficient to overcome the force is applied (i.e., adjustment by a user). Front surface 143 of computer component 102 defines a shallow recess 150 that seats slide assembly 144.

In this particular embodiment biasing member 148 is a constant force spring that is sufficient to prevent the force of gravity from displacing display component 104 downwardly. Constant force spring 148 is essentially a flat, semi-rigid material (e.g., metal or plastic) that is rolled at one end. Front surface 143 of computer component 102 defines a recess 146 that receives the coiled end of fixed force spring 148. The other end of spring 148 is fastened to the lower end of a portion of slide member 144 that is fixed to display component 104. As display component 104 is raised, spring 148 coils within recess 146. As display component 104 is lowered, spring 148 is drawn out from recess 146. The frictional force between spring 148 and the walls of recess 146 is sufficient to prevent unwanted movement of display component 104.

Figure 6:
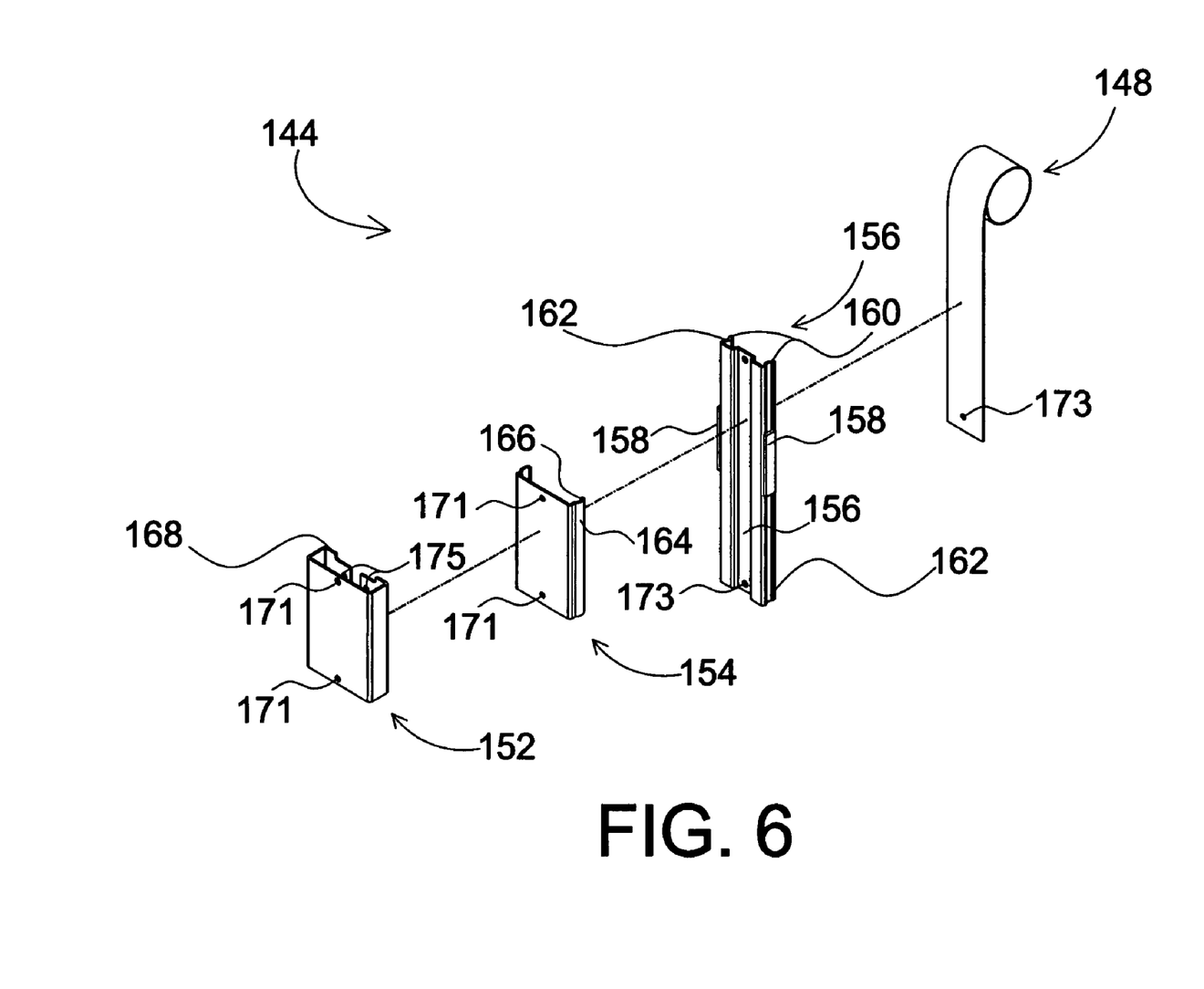
FIG. 6 is an exploded view of the slide assembly of FIG. 5.

FIG. 6 is an exploded view of slide assembly 144. Slide assembly 144 includes a rail bracket 152, a slide member 154, a complementary slide member 156, bearings 158 and fixed force spring 148. In this particular embodiment, fixed force spring 148 is positioned in a channel formed between side rails 160 of complementary slide member 156. Side rails 160 also define outwardly facing channels 162 that accept bearings 158. When slide assembly 144 is assembled, fixed force spring 148 is fixed to complementary slide member 156 at or near the lower end of complementary slide member 156. Slide member 154 includes side rails 164, which define inwardly facing channels 166. Complementary slide member 156 is slidably disposed within slide member 154 such that outwardly facing channels 162 of complementary slide member 156 and inwardly facing channels 166 defines a retaining space that houses bearings 158.

Bearings 158 facilitate smooth, low-friction movement of internal guide 156. Bearings 158 are shown representationally in FIG. 6 as a rectangular bar. Although bearings 158 could be formed as a solid slide bearing of, for example, TEFLON®, it is also anticipated that other types of bearings (e.g., ball bearings) could be used. Note that the bearings are retained within inwardly facing channels 166 of slide member 154 by, for example, slightly crimping the ends of side rails 164, such that bearings 158 remain in place as complementary slide member slides vertically within slide member 154.

Slide member 144 is assembled and coupled between computer component 102 and display component 104 as follows. First, bearings 158 are positioned within channels 166 of slide member 154. Then, complementary slide member 156 is positioned within slide member 154, such that bearings 158 are held in place. Next, fixed force spring 148 is positioned in the rear channel of complementary slide member 156 and held in place there. Rail bracket 152 is slid upward from the lower end of complementary slide member 156 such that rear flanges 168 of rail bracket 152 wrap around the entire assembly. Rail bracket 152 is then fixed to slide member 154 with attachment devices (e.g., screws which are not show) at attachment apertures 171. Next, fixed force spring 148 and complementary slide member 156 are fixed to the rear surface of display component 104 with attachment devices through attachment apertures 173. Finally, rail bracket 152 is fixed within recess 150 (FIG. 5) with attachment devices at attachment apertures 175 (only 2 of four visible in FIG. 6).

Note that the slide assembly is not dependent on the particular size of display component 104 or computer component 102. This makes the attachment particularly well suited for computers that are available with different display and/or computer options including, but not limited to display sizes, display resolution, hard drive options, removable media drive options, network interface options, and so on. In particular, a manufacturer (or other entity responsible for the final system configuration) can select one of a plurality of different computer components and one of a plurality of different display components (according to a customer's specifications), and then mount the components together to obtain a custom integrated computer system.

Figure 7A:
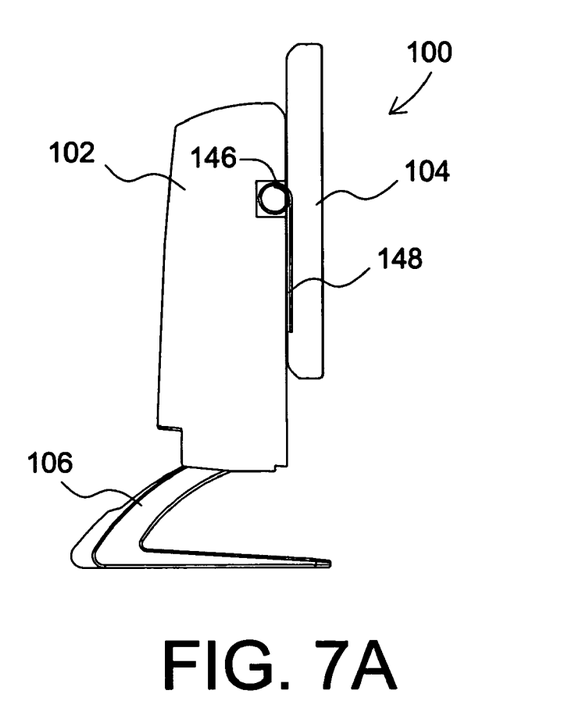
FIG. 7A is a representational side view of the computer of FIG. 1 showing a fixed force spring in a coiled state when the display component is in a raised position.

FIG. 7A is a representational side view of computer 100 with display component 104 in a vertically raised position, illustrating how force spring 148 is disposed between computer module 102 and display module 108. Note that when display component 104 is in a raised position, a significant portion of spring 148 is coiled within recess 150.

Figure 7B:
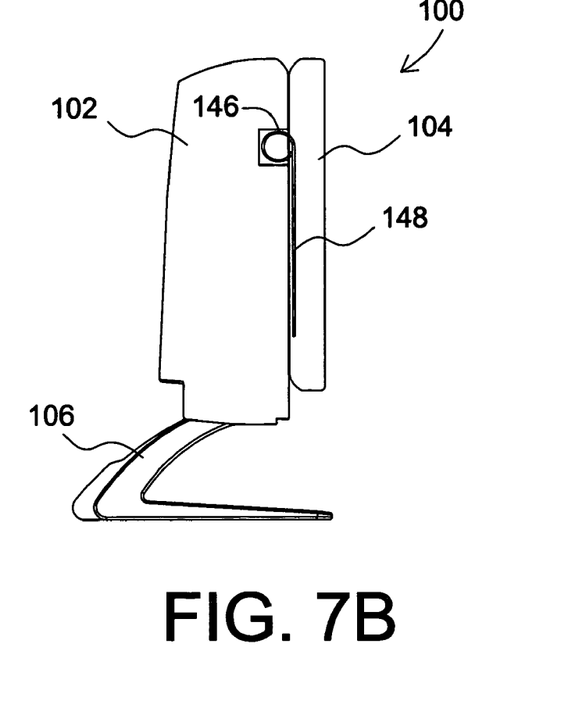

FIG. 7B is similar to FIG. 7A, except that display component 104 is in a lowered position. Because display component 104 is in a lowered position, fixed force spring 148 is only slightly coiled. However, some coiled portion of spring 148 should remain in recess 150 even when display component 104 is in the lowest possible position, in order to facilitate recoiling of spring 148 when display component is raised again.

It should be noted that additional iterations of slide assembly 144 (e.g., 2, 3, etc.) and/or spring 148 can be included computer 100, depending on the needs of a particular system. Further, alternate slide assemblies may substituted for slide assembly 144 without departing from the scope of the invention. For example, complementary rails can be integrally formed or mounted on display housing 110 and computer component housing 112, so as to slidably engage one another. As another example, a slide mechanism employing a shaft and a ring slidably disposed on the shaft. In such embodiments, the biasing member can take the form of material or structure that increases the static friction between the sliding members. The selection of a particular biasing member depends, at least in part, on the weight of display component 104.

Figure 8:
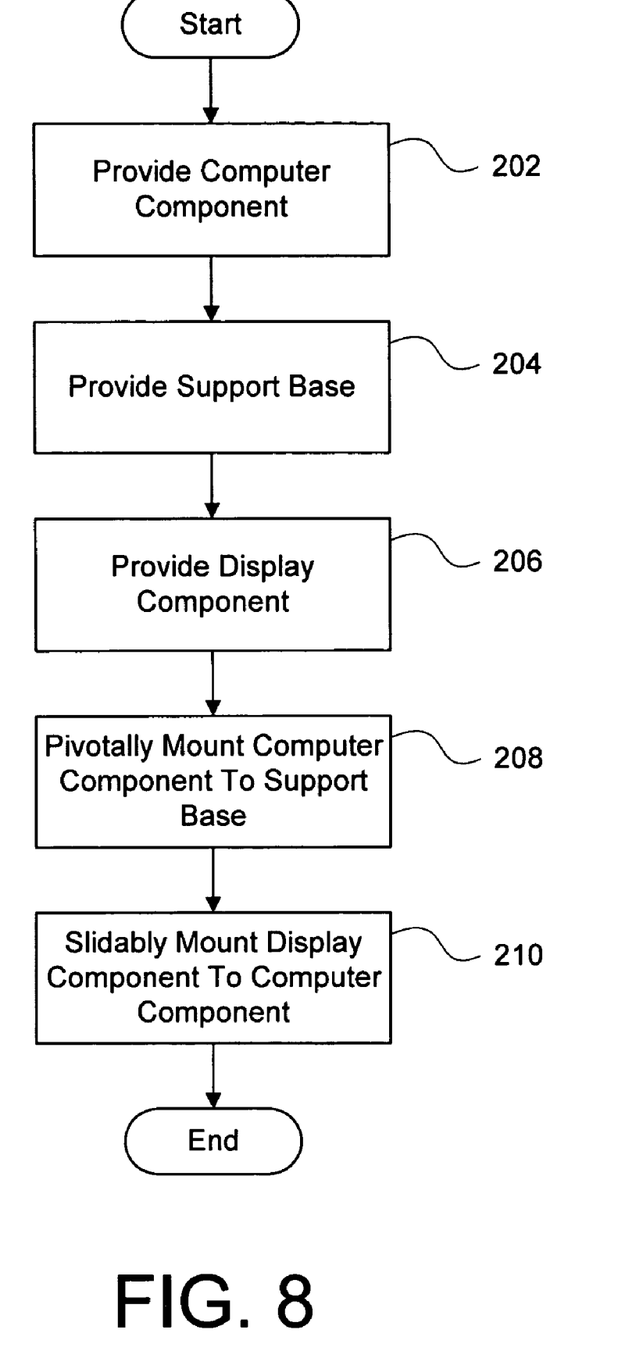
FIG. 8 is a flow chart summarizing method for manufacturing a computer according to one embodiment of the present invention.

FIG. 8 is a flow chart summarizing a method of manufacturing a computer according to one embodiment of the present invention. In a first step 202 a computer component is provided, which can optionally be selected from a plurality of different type computer components. Then, in a second step 204, a support base is provided. Next, in a third step 206, a display component is provided, which can optionally be selected from a plurality of different type display components. Then, in a fourth step 208, the computer component is pivotally mounted to the support base. Finally, in a fifth step 210, the display component is slidably mounted to the computer component to obtain an integrated computer with tilt and height adjustment capabilities.

The description of particular embodiments of the present invention is now complete. Many of the described features may be substituted, altered or omitted without departing from the scope of the invention. For example, as indicated above, alternate biasing members may be substituted for the fixed force spring described herein. As another example, alternate slide mechanisms can be substituted for the slide mechanisms disclosed herein. These and other deviations from the particular embodiments shown will be apparent to those skilled in the art, particularly in view of the foregoing disclosure.

We claim:

1. A computer comprising:
   a support base;
   a computer component pivotally coupled to said support base; and
   a display component slidably coupled to said computer component and movable in a plane adjacent said computer component;
   a slide member fixed to said computer component;
   a complementary slide member fixed to said display component, said complementary slide member slidably engaging said slide member; and
   a fixed force spring coupled to retain said display component in a fixed position relative to said computer component in the absence of an external force and to facilitate movement of said display component with respect to said computer component responsive to an external force.

2. A computer according to claim 1, wherein:
   said computer component includes a generally flat front surface; and
   said display component includes a generally flat rear surface facing said front surface of said computer component.

3. A computer according to claim 2, wherein:
   said computer component includes at least one electronic circuit and defines an aperture facing said display component;
   said display component includes at least one electronic circuit and defines an aperture facing said computer component; and
   the computer includes at least one flexible connector electrically coupling said circuit of said computer component with said circuit of said display component.

4. A computer according to claim 2, wherein said display component includes a display panel facing in a direction away from said computer component.

5. A computer according to claim 4, wherein said display component further includes at least one speaker.

6. A computer according to claim 4, wherein said display panel is a liquid crystal display panel.

7. A computer according to claim 2, wherein said computer component includes user accessible electronic connectors on said front surface of said computer component.

8. A computer according to claim 7, wherein said computer component further includes external electronic connectors on a back surface of said computer component.

9. A computer according to claim 2, wherein said computer component includes a removable media drive accessible through an opening disposed in a side of said computer component.

10. A computer according to claim 1, wherein said computer component, when viewed from the front of said computer, is both wider and taller than it is deep.

11. A computer according to claim 10, wherein the depth of said computer component is less than one-half of the width of said computer component.

12. A computer according to claim 10, wherein said computer component is pivotally connected to said base to facilitate forward and backward tilting of said computer component.

13. A computer according to claim 1, wherein said plane is disposed generally vertically when said computer component is in an upright position.

14. A computer according to claim 1, wherein said slide member is fixed vertically to a front central portion of said computer component.

15. A computer according to claim 1, wherein:
    one of said display component and said computer component defines a recess in a portion thereof; and
    said fixed force spring includes a generally flat, flexible member having a first end coiled in said recess and a second end fixed to the other of said display component and said computer component.

16. A computer according to claim 1, wherein:
    said slide member is integrally formed in a housing of said computer component; and
    said complementary slide member is integrally formed in a housing of said display component.

17. A computer according to claim 16, wherein:
    said slide member includes a pair of structures each formed along a respective lateral portion of said computer component; and
    said complementary slide member includes another pair of structures each formed along a respective lateral portion of said display component.

18. A computer according to claim 1, wherein said support base includes:
    a flat base portion; and
    a vertically inclined portion extending forwardly and upwardly toward said pivotal connection with said computer component.

* * * * *